United States Patent
Sadrieh

(10) Patent No.: US 11,249,167 B2
(45) Date of Patent: Feb. 15, 2022

(54) LOCATION DETERMINATION USING CROWD SOURCED INFORMATION

(71) Applicant: RX NETWORKS INC., Vancouver (CA)

(72) Inventor: Seyed Nima Sadrieh, Vancouver (CA)

(73) Assignee: RX NETWORKS INC., Vancouver (CA)

( * ) Notice: Subject to any disclaimer, the term of this patent is extended or adjusted under 35 U.S.C. 154(b) by 656 days.

(21) Appl. No.: 16/071,359

(22) PCT Filed: Jan. 19, 2017

(86) PCT No.: PCT/CA2017/050059
§ 371 (c)(1),
(2) Date: Jul. 19, 2018

(87) PCT Pub. No.: WO2017/124189
PCT Pub. Date: Jul. 27, 2017

(65) Prior Publication Data
US 2021/0072342 A1    Mar. 11, 2021

Related U.S. Application Data

(60) Provisional application No. 62/281,613, filed on Jan. 21, 2016.

(51) Int. Cl.
*G01S 5/02* (2010.01)
(52) U.S. Cl.
CPC ........ *G01S 5/02527* (2020.05); *G01S 5/0242* (2013.01); *G01S 5/0289* (2013.01); *G01S 5/02525* (2020.05)

(58) Field of Classification Search
CPC ............. G01S 5/02527; G01S 5/02525; G01S 5/0242; G01S 5/0289; G01S 5/0252;
(Continued)

(56) References Cited

U.S. PATENT DOCUMENTS

| 7,406,116 B2 | 7/2008 | Agrawala et al. |
| 9,081,080 B2 | 7/2015 | Gupta et al. |

(Continued)

OTHER PUBLICATIONS

International Patent Application No. PCT/CA2017/050059, International Preliminary Report on Patentability dated Aug. 2, 2018.

(Continued)

*Primary Examiner* — Shaima Q Aminzay
(74) *Attorney, Agent, or Firm* — Geoffrey deKleine; Borden Ladner Gervais LLP

(57) ABSTRACT

A method of determining locations of access points in a venue, one or more electronic devices configured to receive radio signals from the access points, the method comprises: generating and storing, at a server in communication with the one or more electronic devices, a database comprising information received from the one or more electronic devices, the information comprising: values associated with a radio signal characteristic of the radio signals at locations of RF scan capture by the one or more electronic devices and access point identifiers representing access points corresponding to the values, the locations of RF scan capture being unknown at a time of RF scan capture; assigning correlation values to quantify similarity between the values for pairs of the access point identifiers; mapping the correlation values to correlation ranges based on known locations of at least two of the access points; determining the locations of the access points based on the correlation ranges and the known locations.

20 Claims, 11 Drawing Sheets

(58) Field of Classification Search
CPC ........ G01S 5/14; G01S 5/0205; G01S 5/0221;
H04W 4/021; H04W 4/029; H04W 4/80;
H04W 12/084
USPC ...................................................... 455/456.1
See application file for complete search history.

(56) References Cited

U.S. PATENT DOCUMENTS

| | | |
|---|---|---|
| 9,119,168 B2 | 8/2015 | Huang et al. |
| 2011/0059752 A1* | 3/2011 | Garin .................... G01S 5/0242 |
| | | 455/456.1 |
| 2013/0344886 A1 | 12/2013 | Jarvis et al. |
| 2015/0080014 A1 | 3/2015 | Ben-Yosef et al. |

OTHER PUBLICATIONS

International Patent Application No. PCT/CA2017/050059, International Search Report and Written Opinion dated Apr. 25, 2017.
European Patent Application No. 17740936.4, Extended European Search Report dated Oct. 2, 2019.

* cited by examiner

LOCATION DETERMINATION USING CROWD SOURCED INFORMATION

TECHNICAL FIELD

The present disclosure relates to systems, methods and apparatus for location determination in weak Global Navigation Satellite System (GNSS) signal environments.

BACKGROUND

Although GNSS performs well in open sky conditions, GNSS receivers often fail to provide a position fix in dense urban areas or indoors. The emergence of Location-Based Services (LBS) has motivated the development of positioning systems that complement GNSS to provide a position fix in any circumstances. Currently, Wi-Fi based solutions are common for indoor and dense urban environments because such solutions provide position fixes that are sufficiently accurate for many LBS. Hybrid positioning system, which combine Wi-Fi positioning and GNSS provide solutions for both indoor and outdoor environments.

In general, Wi-Fi based positioning systems infer a location based on nearby Wi-Fi access points (AP) detected by a user's device. Locations of access points detected by the user device may be used to determine a location of the user device or information from the access points detected by the user device may be compared with a reference database that contains Wi-Fi access point information, such as received signal strength values, for example.

A challenge of current Wi-Fi positioning systems is generation of accurate position-tagged Wi-Fi Radio Frequency (RF) scan captures by user devices. Current Wi-Fi positioning systems rely on mobile devices to crowd-source and geo-tag lists of Wi-Fi access points in order to build the reference database. Such a solution is unreliable indoors or in deep urban environments since the geo-tagging relies on GNSS and GNSS does not work well in those areas. Currently, in such environments, positions of Wi-Fi access point RF scan captures from user devices may be skewed toward a venue perimeter or outdoors, where, for example, the last GNSS position was available, or the scan captures are discarded as no position may be determined at all.

It may be possible for a reference database to be generated by manually recording positions in environments where GNSS may not be relied upon, however, this solution is neither cost effective nor easily scalable. Other solutions are therefore sought.

SUMMARY

According to an aspect of the present disclosure there is provided a method of determining locations of access points in a venue, one or more electronic devices configured to receive radio signals from the access points, the method comprising: generating and storing, at a server in communication with the one or more electronic devices, a database comprising information received from the one or more electronic devices, the information comprising: values associated with a radio signal characteristic of the radio signals at locations of RF scan capture by the one or more electronic devices and access point identifiers representing access points corresponding to the values, the locations of RF scan capture being unknown at a time of RF scan capture; assigning correlation values to quantify similarity between the values for pairs of the access point identifiers; mapping the correlation values to correlation ranges based on known locations of at least two of the access points; determining the locations of the access points based on the correlation ranges and the known locations.

According to another aspect of the present disclosure there is provided a system for determining locations of access points in a venue, the system comprising: one or more electronic devices configured to receive radio signals from the access points; and a server in communication with the one or more electronic devices, the server configured to: generate and store a database comprising information received from the one or more electronic devices, the information comprising: values associated with a radio signal characteristic of the radio signals at locations of RF scan capture by the one or more electronic devices and access point identifiers representing access points corresponding to the values, the locations of RF scan capture being unknown at a time of RF scan capture; assign correlation values to quantify similarity between the values for pairs of the access point identifiers; and map the correlation values to correlation ranges based on known locations of at least two of the access points; wherein the locations of the access points are determined based on the correlation ranges and the known locations.

DRAWINGS

The following figures set forth examples in which like reference numerals denote like parts. The present disclosure is not limited to the examples illustrated in the accompanying figures.

DETAILED DESCRIPTION

Figure 1:
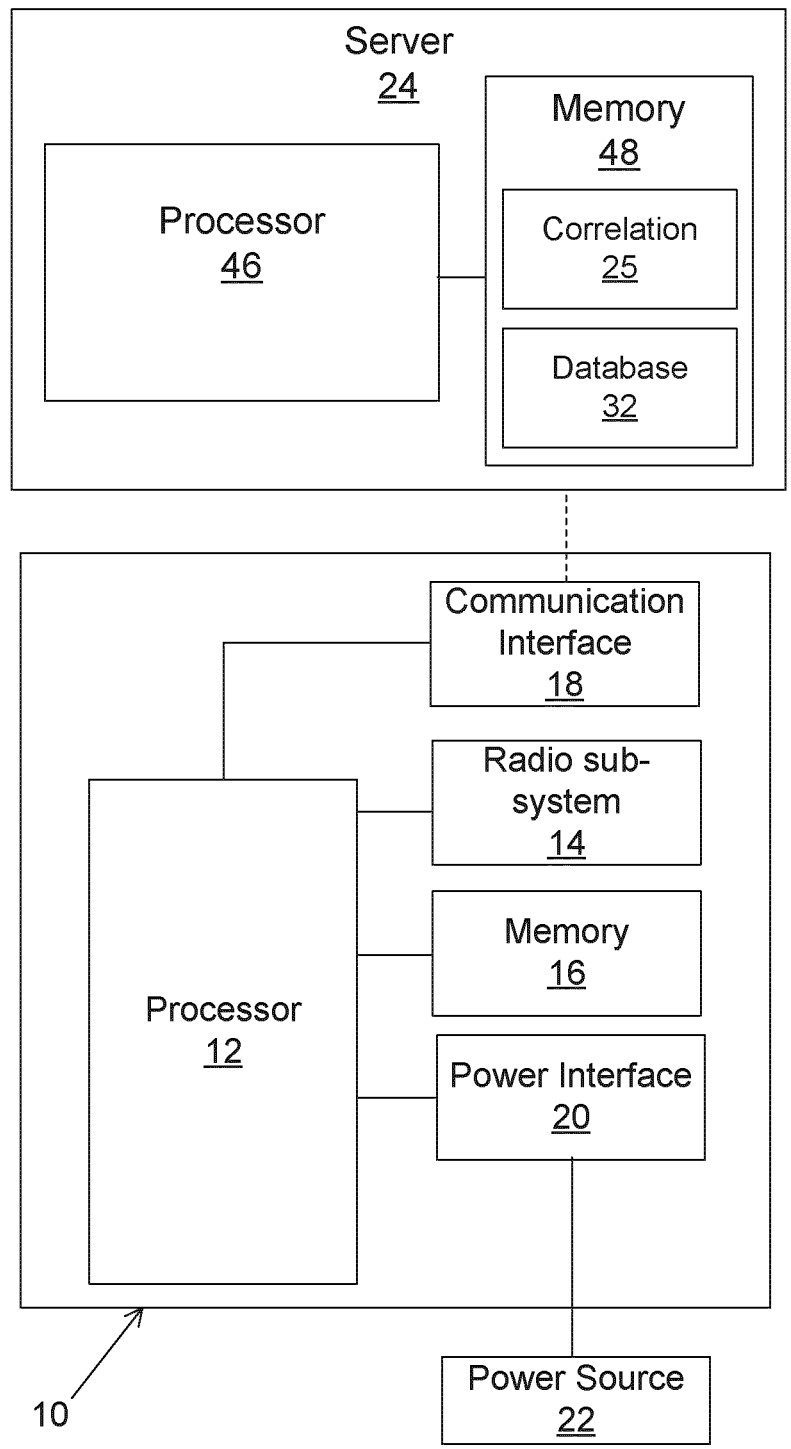
FIG. 1 is a schematic block diagram of an electronic device from which radio signal information of nearby access points may be obtained by a server.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. Unless explicitly stated, the methods described herein are not constrained to a particular order or sequence. Additionally, some of the described methods or elements thereof can occur or be performed at the same point in time. In other instances, well-known methods, procedures and components have not been described in detail so as not to obscure the examples described herein. Also, the description is not to be considered as limiting the scope of the examples described herein.

It will be appreciated by a person skilled in the art that "correlation" metric is referred to throughout the present disclosure by way of example only. The systems, methods and apparatus of the present disclosure are applicable to any metric quantifying the similarity or independency of measurements. Example correlation metrics include: mutual information and correlation coefficient.

Referring to FIG. 1, an electronic device 10 capable of detecting radio signals is shown. The electronic device 10 may be a Smartphone, laptop computer, desktop computer, or tablet, for example. In the present example, the electronic device 10 is a wireless local area network (WLAN) enabled device capable of detecting Wi-Fi signals. The electronic device 10 includes a processor 12 that controls overall operation of the electronic device 10, a radio sub-system 14, memory 16, a communication interface 18, which selectively communicates with server 24, for example, and a power source 22 that supplies power to the device 10 via power interface 20. In some examples, the electronic device 10 includes positioning capability, such as a GNSS antenna and associated hardware and software to determine its own position, for example.

The radio sub-system 14 includes an antenna to detect Wi-Fi signals from access points (APs). Information extracted from the Wi-Fi signals by the radio sub-system 14 is referred to as a Radio Frequency (RF) scan capture. RF scan captures are performed at RF scan capture locations at particular times. The information includes Media Access Control (MAC) addresses and corresponding values associated with the Wi-Fi signals received from the access points. The values include: received signal strengths (RSS) corresponding to the MAC addresses, Bit Error Rate (BER), Time of Flight (ToF), Time of Arrival (ToA), Round trip Time (RTT) and other values associated with the Wi-Fi signals received from the access points, for example. The information extracted from the RF scan captures may be sent to server 24 or to another electronic device when extracted or may be stored locally in memory 16 and sent at a later time, such as when a selected network connection is available, for example.

Server 24 includes a processor 46 in communication with a memory 48 that includes correlation software executable by the processor 46 and a database 32 that stores information for use in determining ranges.

Figure 2:
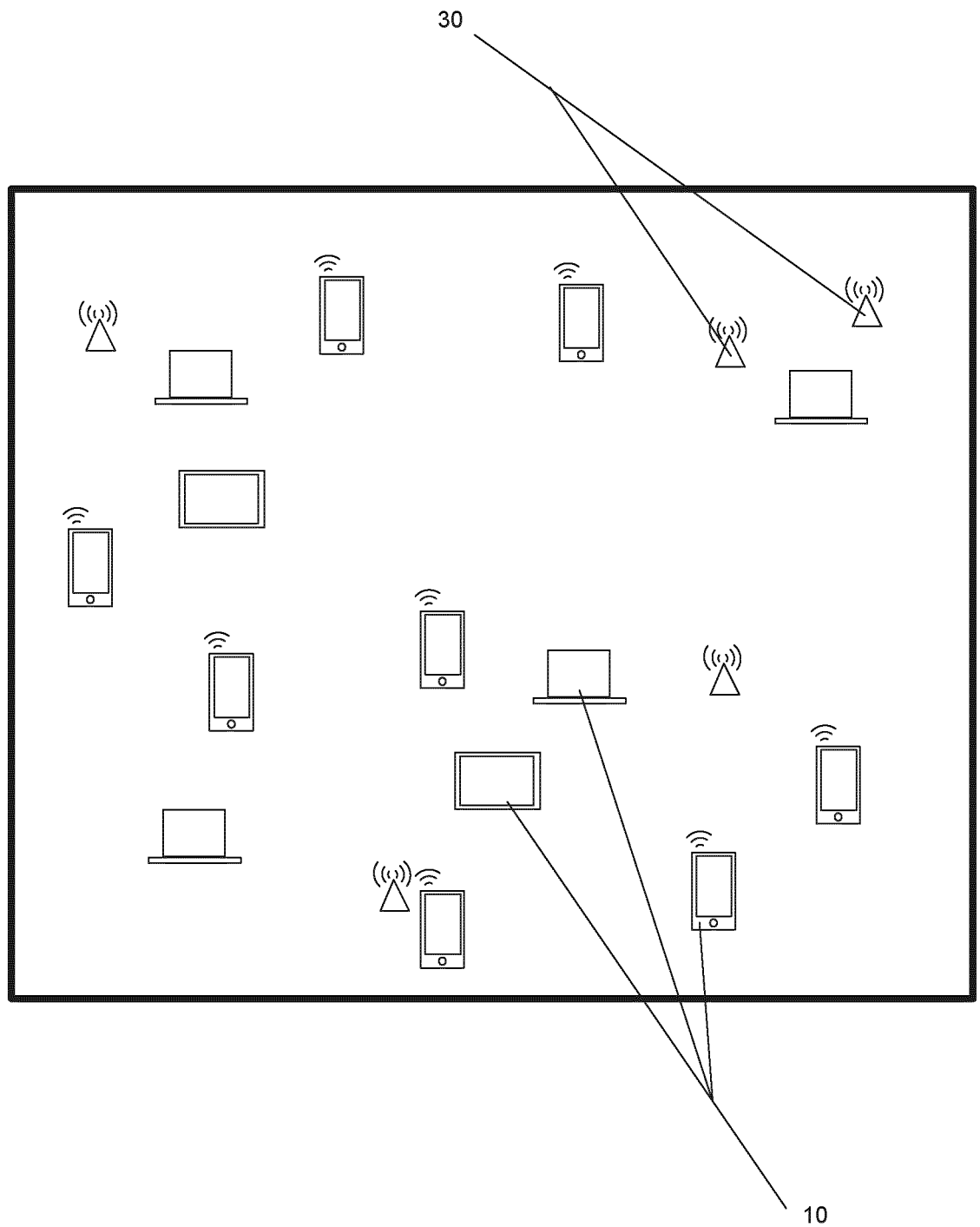
FIG. 2 is a schematic diagram of different types of electronic devices at different locations relative to multiple access points.

Referring to FIG. 2, multiple electronic devices 10 are located within a venue having limited GNSS coverage. Five access points 30 are located in the venue, as shown. The electronic devices 10 detect Wi-Fi signals, extract information from the signals and send the RF scan captures to the server 24, or to another device in communication with the electronic devices 10, where a database 32 is generated and stored. One electronic device 10 may send multiple RF scan captures from the same or different locations of a venue. Alternatively, more than one electronic device 10 may send one or more RF scan captures from the same or different locations of a venue.

Figure 3:
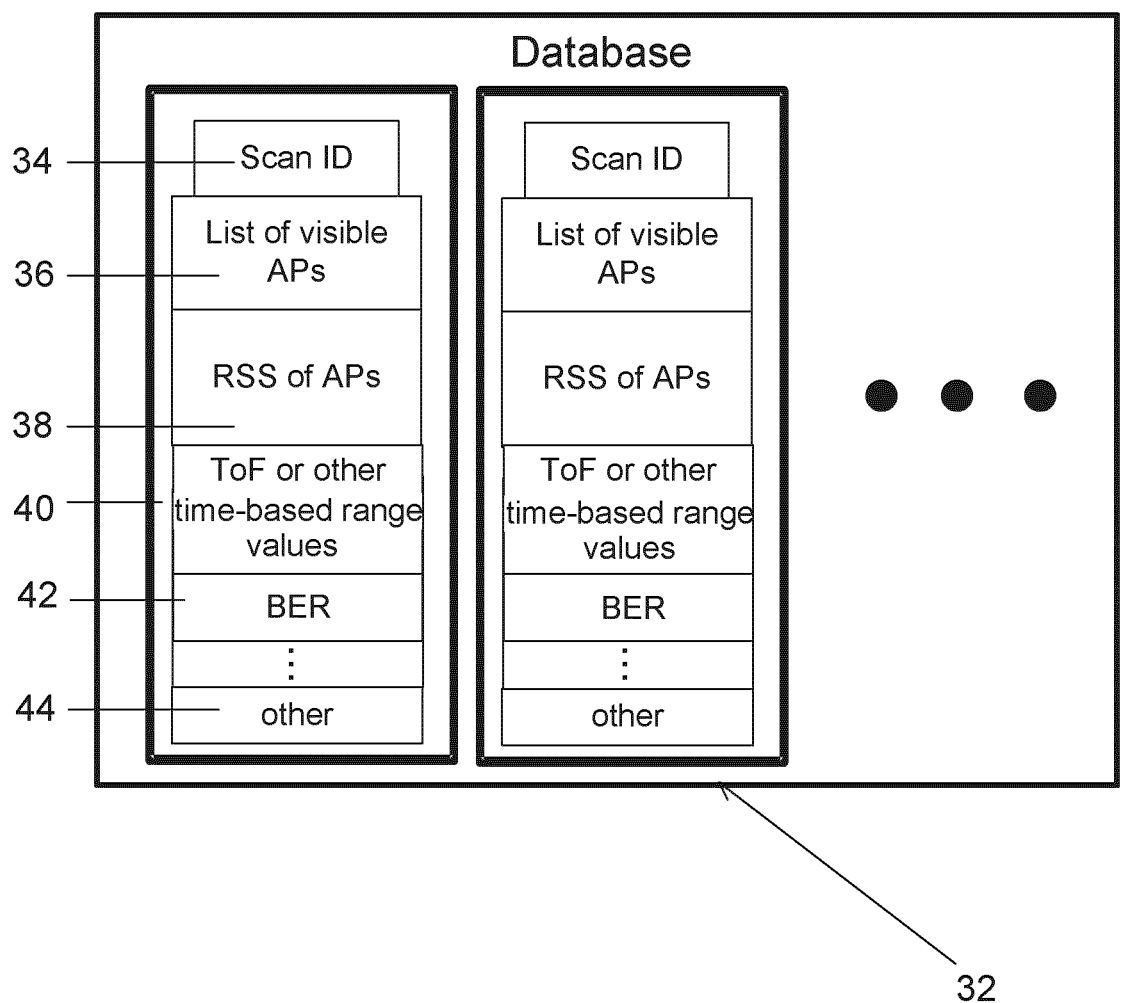
FIG. 3 is a schematic diagram showing RF scan capture information stored in a database according to an example of the method of the present disclosure.

Referring also to FIG. 3, information in the database 32 includes: identifiers 34 representing locations of RF scan captures, which are unknown at the time of RF scan capture, a list of access points 36 from which Wi-Fi signals were received by one or more electronic devices 10 and received signal strength values corresponding to the access points 38. A method of determining ranges between access points in the venue may be performed using the information in the database 32. When the database 32 is populated with information from many RF scan captures from multiple electronic devices 10, the database 32 may be referred to as a crowd sourced database.

In some examples, the information in the database 32 also includes: Time of Flight (ToF) or other ranging values 40 from the access points 30, if available, Bit Error Rate (BER) 42 and other information 44, which may be customized for use by individual venues, for example.

Figure 4:
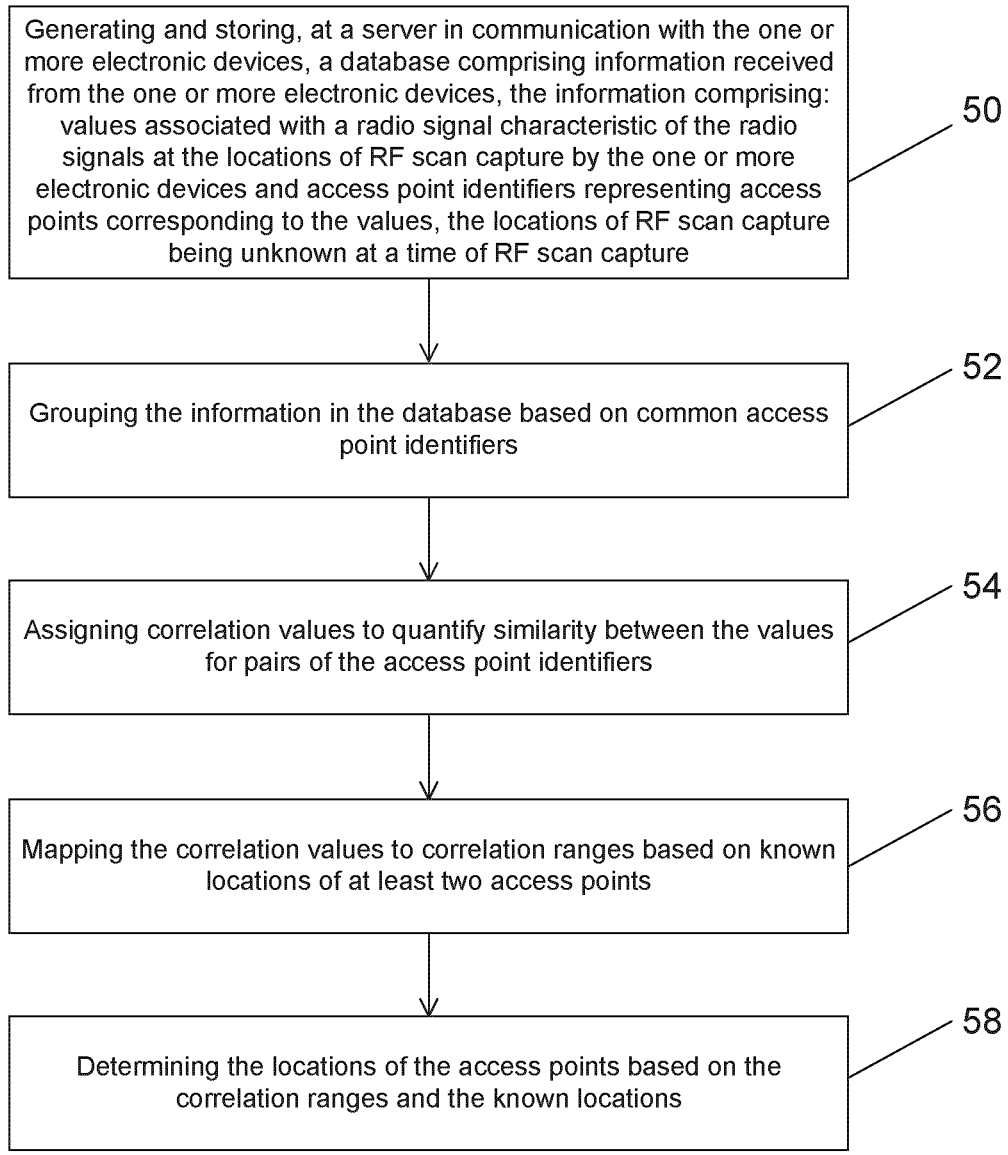
FIG. 4 is a flowchart depicting a method of determining ranges between access points in a venue according to an example.

Referring to FIG. 4, the method of determining ranges between access points 30 in a venue will now be described. At 50, database 32 is generated and stored at a server 24 in communication with the electronic devices 10. The database 32 includes information received from the one or more electronic devices 10. The information includes: values associated with a radio signal characteristic of the radio signals at locations of RF scan capture by the one or more electronic devices and access point identifiers representing access points corresponding to the values. The locations of RF scan capture are unknown at the time of RF scan capture. At 52, the information is grouped based on common access point identifiers. At 54, correlation values are assigned to quantify similarity between the values for pairs of the access point identifiers. At 56, the correlation values are mapped to correlation ranges based on known locations of at least two access points. The mapping is achieved by applying a mapping function. The mapping is a linear mapping that equates the correlation value between two access points to the range between the two access points in order to determine a multiplication factor to be applied to other correlation values. At 58, locations of the access points 30 are determined based on the known locations and the correlation ranges. The locations of RF scan capture correspond to the locations of the one or more electronic devices 10 at the time of RF scan capture. In an example, a density of RF scan captures of one scan per approximately every 2 m$^2$ results in a location accuracy of within approximately 5 metres.

In an example, the radio signal characteristic of the radio signals is received signal strength. The radio signal characteristic may alternatively be Bit Error Rate or time-based range. In another example, the values are a combination of two or more of: received signal strength values, Bit Error Rate values and time-based range. In examples in which a combination of radio signal characteristics is used, such as received signal strength and Bit Error Rate, for example, separate correlation values are determined and the correlation values are mapped to correlation ranges based on the known locations. Therefore, two correlation ranges are determined, one based on received signal strength and one based on Bit Error Rate, according to the example. The two correlation ranges are then merged to determine the correlation range for use in determining location. The correlation ranges may be merged by averaging the two correlation ranges or by another method.

In general, the mapping function is a polynomial of $n^{th}$ degree. Thus, mapping of the correlation values to correlation ranges may alternatively be non-linear. As will be understood by a person skilled in the art, a sufficient volume of data should be obtained in order to estimate n coefficients with acceptable accuracy.

The known locations of the access points 30 may be determined manually or by GNSS when a reliable position is achievable. In addition, the known locations of the access points 30 may be determined by matching a name of a Wi-Fi access point 30 to a location on a map of a venue. For example, in a shopping mall, a location of a Wi-Fi access point 30 called "camera store" is determined to be located within a camera store on the map.

In order to perform the method, the processor 46 executes one or more software applications 25 that are stored in memory 48 at the server 24 as computer readable code. The processor 46 receives information to populate the database 32, which is stored in the memory 48, from the electronic devices 32 and retrieves information from the database 32 to perform the method. Alternatively, the method may be performed by dedicated hardware of the processor 24, such as Application Specific Integrated Circuit (ASIC) or Graphics Processing Unit (GPU), for example, or by a combination of hardware and software. Parts of the method may alternatively be performed at one or more of the electronic devices 10 in communication with the server 24.

Following location determination of the access points 30, the information may be included in the database 32, or another database, to tag the location of the access points 30. The location-tagged information may later be used to estimate a location of an electronic device 10 that detects matching access points 30. Alternatively, database 32, or another database, may be used as a fingerprinting reference database. The fingerprinting reference database includes individual or vectors of access point signal characteristics, such as received signal strength values, for example, recorded at different locations in the venue. Electronic devices 10 that detect matching access points may be positioned using the fingerprinting reference database.

Figure 5:
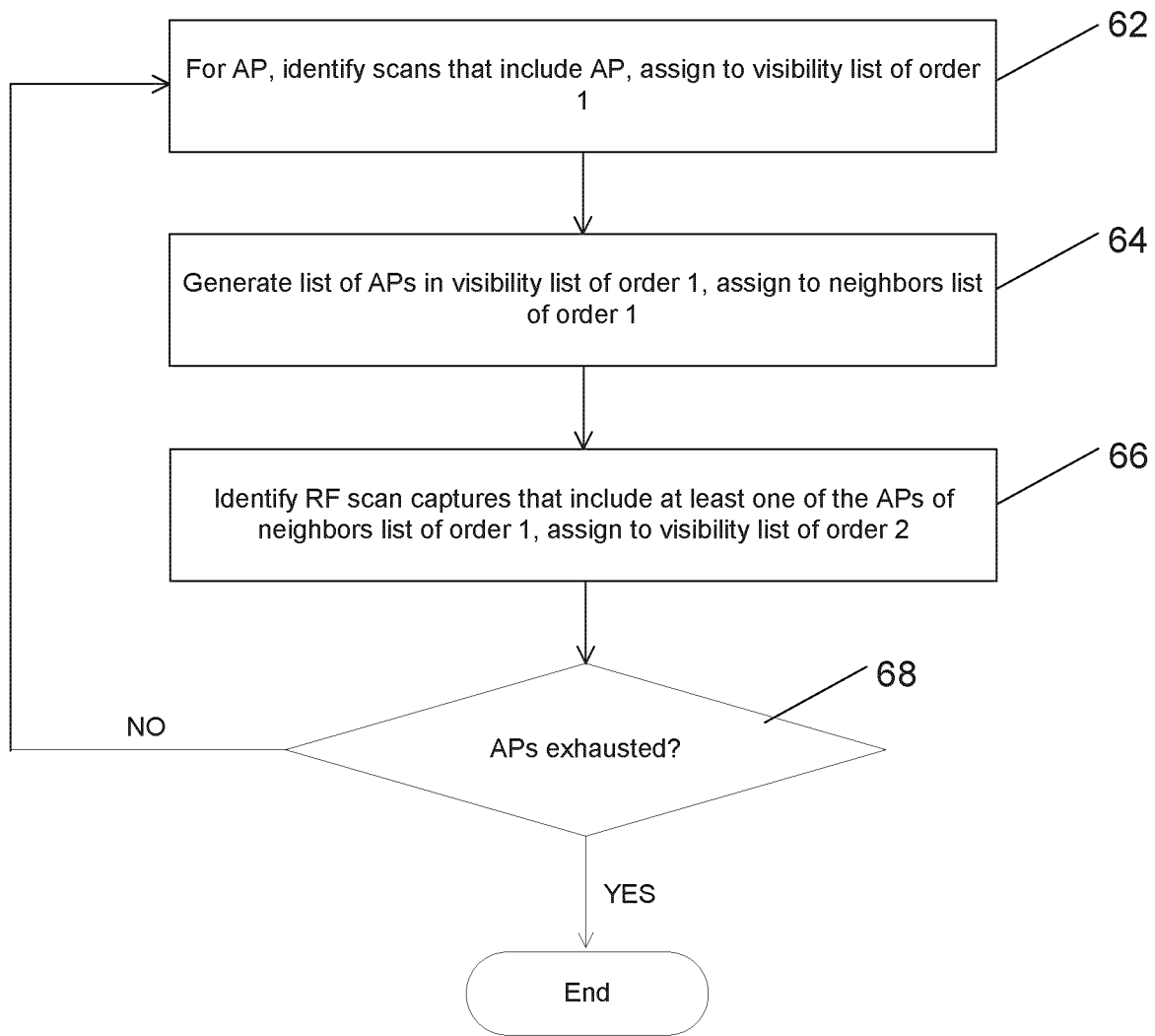
FIG. 5 is a flowchart depicting a method of grouping information from the database.
Figure 6:
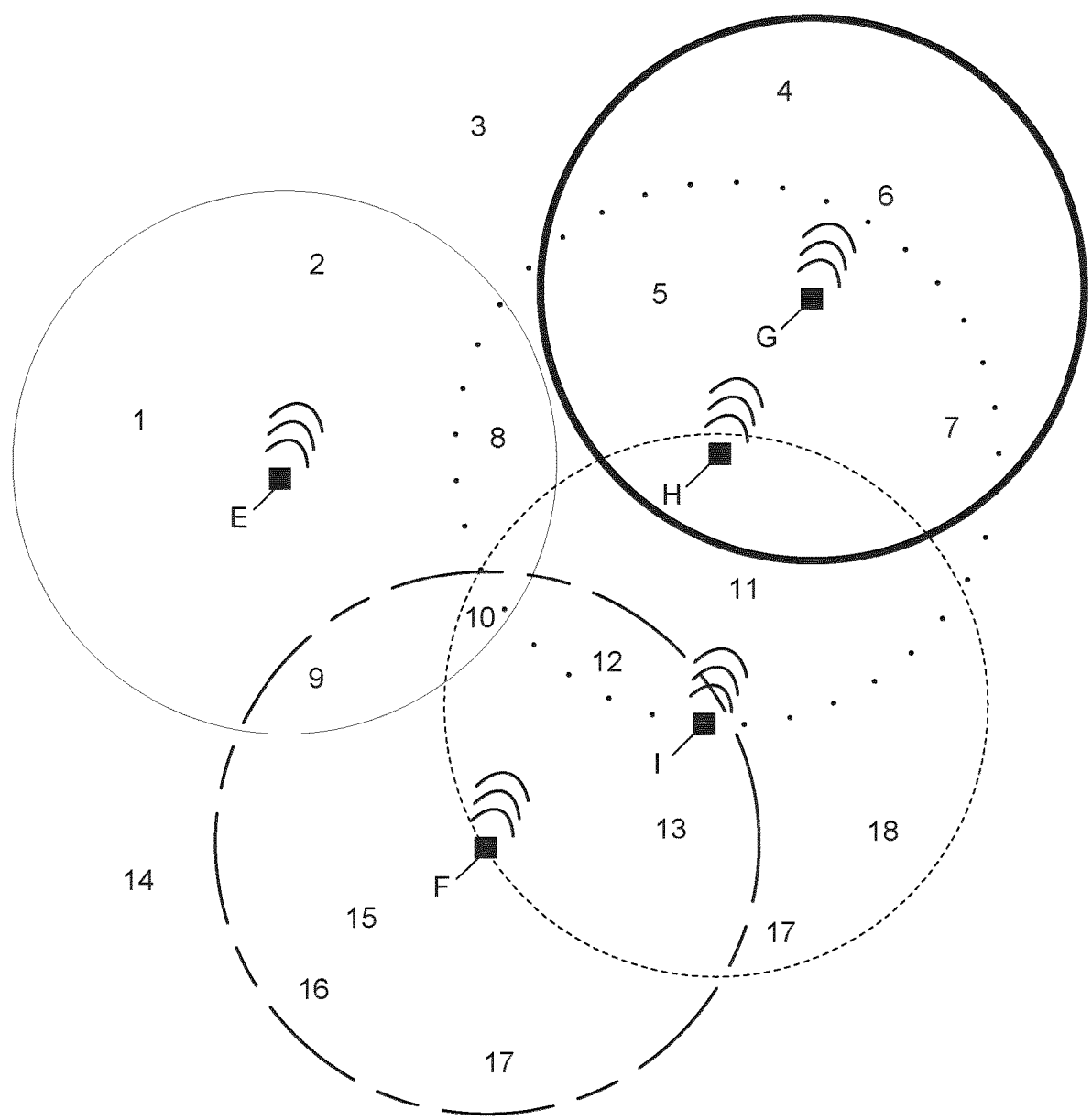
FIG. 6 is a schematic view of another example venue including four access points.

Referring also to FIG. 5, a method of grouping the RF scan captures, indicated at 52 of FIG. 4, is shown. At 62, for a first access point 30, RF scan captures that include the access point 30 are identified and assigned to a visibility list of order 1. At 64, a list of access points 30 in visibility list of order 1 is generated and assigned to a neighbors list of order 1. At 66, RF scan captures that include at least one of the access points 30 of the neighbors list of order 1 are identified and assigned to a visibility list of order 2. The method is repeated for next access points 30, at 68, until all RF scan captures have been grouped with one or more access points 30. An example of the method of grouping with respect to access point E is shown in FIG. 6 and the following table:

| Access Point E: | | |
| --- | --- | --- |
| Scan Capture Visibility List - order 1 | Neighbors List - order 1 | Scan Capture Visibility List - order 2 |
| 1 | | |
| 2 | | |
| 8 | G; H; I | 5, 7, 11, 12; 5, 7, 8, 11, 12; 10, 1, 12, 13, 17, 18 |
| 9 | F | 9, 10, 12, 13, 15, 16, 17 |
| 10 | F; I | 9, 10, 12, 13, 15, 16, 17 |

Grouping the information based on common access point identifiers reduces computational time by avoiding comparison of received signal strengths of access points that do not include any overlapping RF scan captures, for example. Grouping of the information based on common access point identifiers, at 52, may be omitted from the method in some examples.

Figure 7:
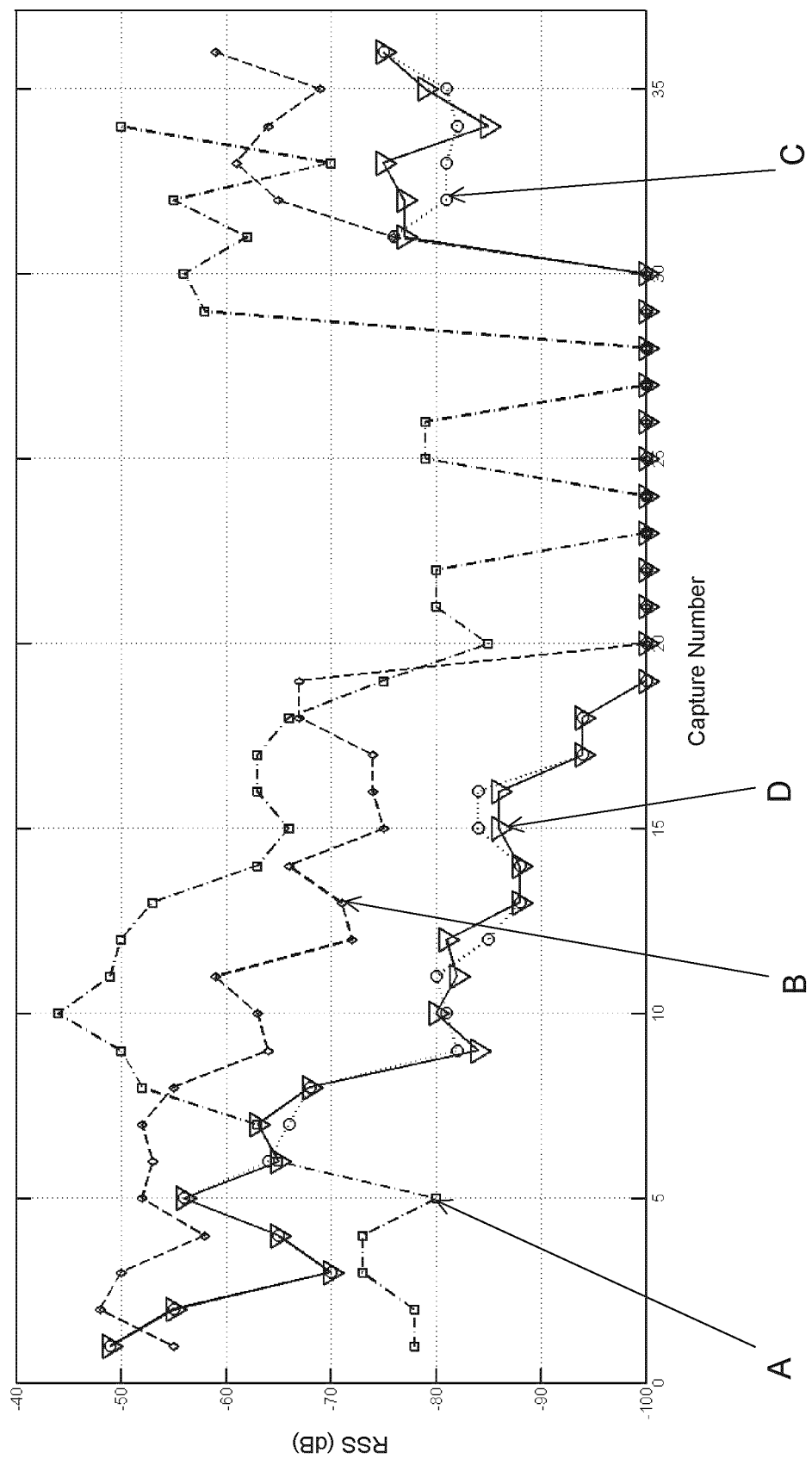
FIG. 7 is a graph depicting signal strength measurements of four access points in a venue from different RF scan captures.
Figure 8:
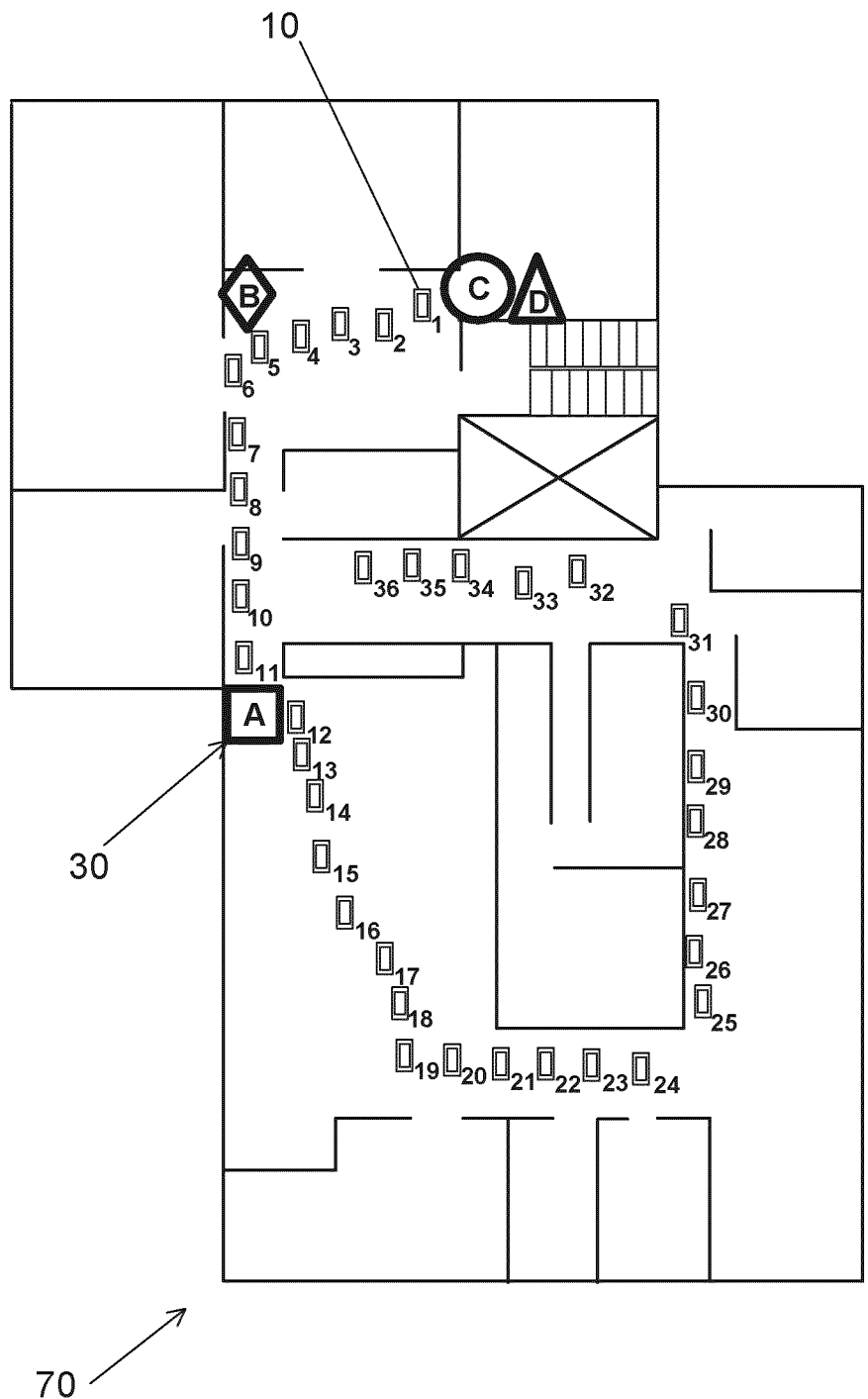
FIG. 8 is a schematic plan view of the venue of FIG. 7 including the four access points and RF scan locations at which the electronic device of FIG. 1 or another electronic device received radio signals.

In order to assign correlation values, according to an example, received signal strength values corresponding to radio signals received at different electronic devices 10 and sent from common access points 30 are compared and the similarity therebetween is quantified. Referring to FIG. 7, received signal strength values of different RF scan captures are plotted in order to expose similarities between received signal strength values at RF scan capture locations. The access points 30 from which radio signals are received are shown in FIG. 8 and identified by reference characters A, B, C and D. Numbers 1-36 in FIG. 8 represent the locations of the electronic device(s) 10 at times of the RF scan captures. From the graph, it can be determined that access points C and D are very close to one another.

Figure 9:
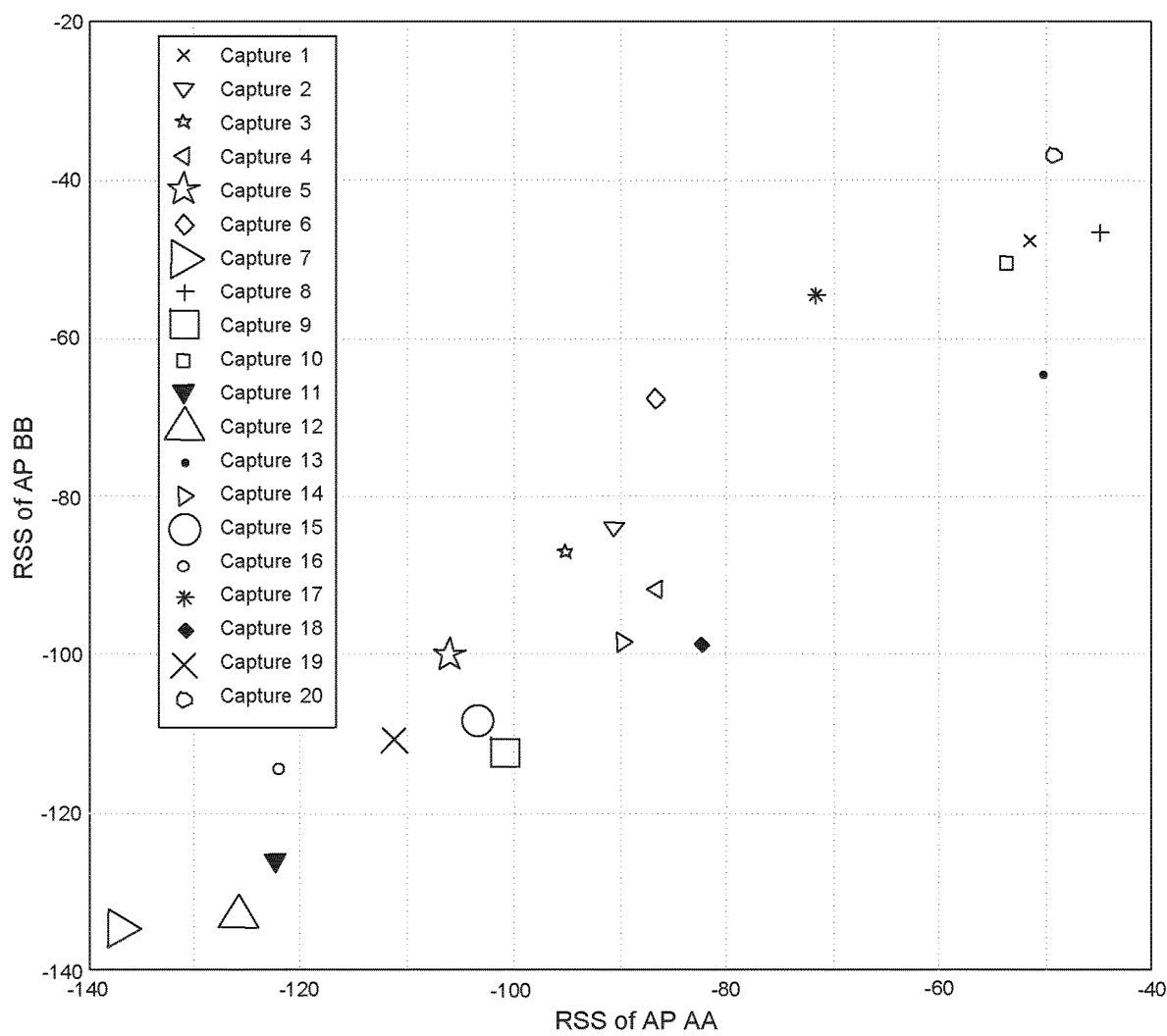
FIG. 9 is a graph depicting signal strength values captured at RF scan capture locations by one or more electronic devices for access point pair: AA and BB.

In an example, the correlation values range from −1 to 1, where a correlation value of 1 indicates that the received signal strengths of two access points are the same in the respective RF scan captures. Referring to FIG. 9, received signal strength values of RF scan captures of an access point pair AA, BB located in a venue are plotted. As shown, a pattern of the received signal strengths is linear, which indicates a high correlation between access points AA and BB. Determination of a high correlation between two access points indicates that the access point locations are near one another.

Referring back to the example of FIG. 6, example assigned correlation values for the access point pairs of the venue are as follows:

| access point Pair | EF | EG | EH | EI | FG | FH | FI | GH | GI | HI |
| --- | --- | --- | --- | --- | --- | --- | --- | --- | --- | --- |
| Correlation Value | 0.85 | 0.80 | 0.85 | 0.80 | 0.75 | 0.85 | 0.90 | 0.95 | 0.80 | 0.90 |

According to an example, the number of RF scan captures may be reduced in order to lower the computational burden at the server 24 prior to range determination being performed. In this example, correlation between RF scan captures is performed, at 54 of the method of FIG. 4, in order to quantify the similarity of pairs of the RF scan captures. Similarity of RF scan captures closely relates to the distance between locations at which the RF scan captures were obtained. Therefore, RF scan captures that are determined to be highly correlated with one another are determined to be redundant RF scan captures. When redundant RF scan captures are present, a representative RF scan capture is maintained and others of the redundant RF scan captures are filtered out and discarded.

Figure 10:
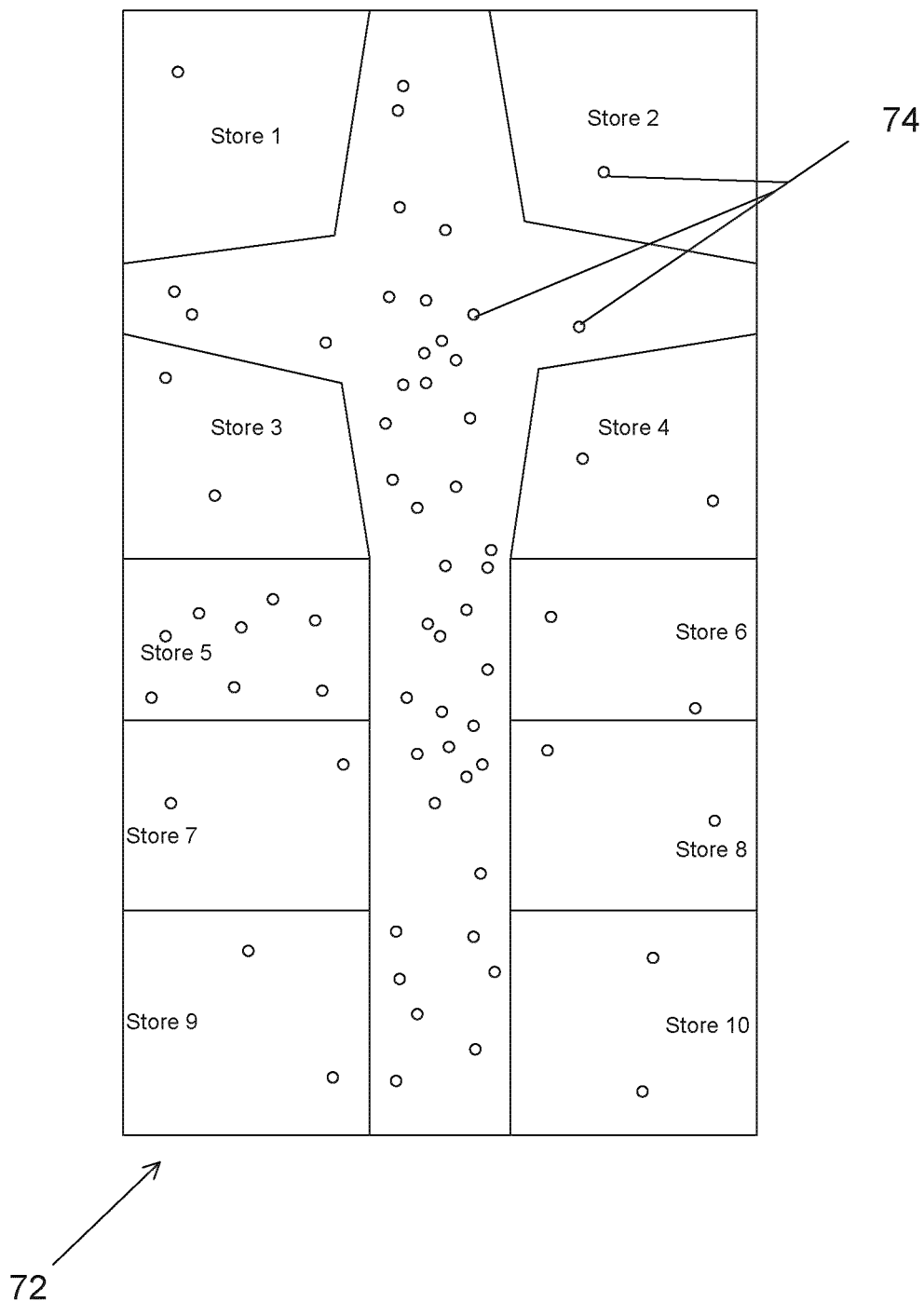
FIG. 10 is a schematic plan view of another example venue showing locations of RF scan capture.
Figure 11:
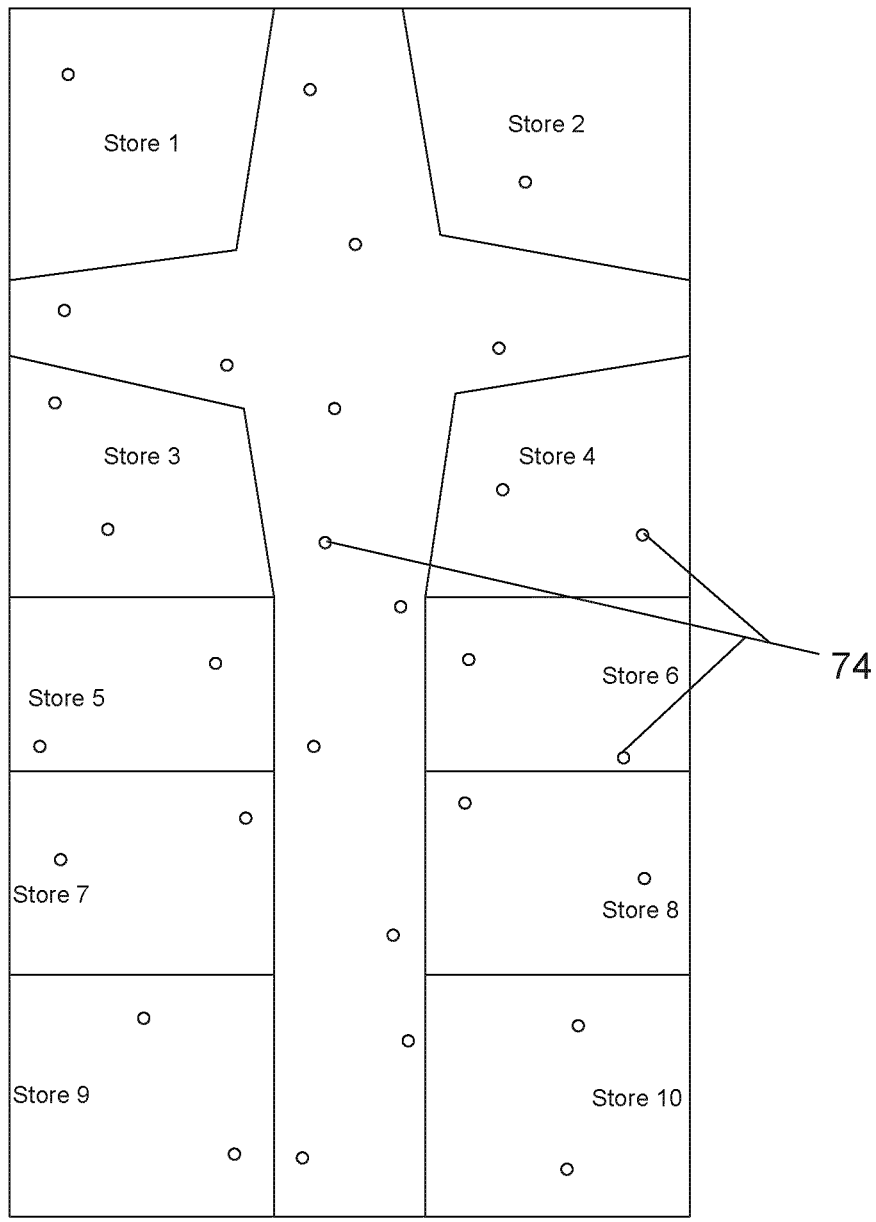
FIG. 11 is a view similar to the view of FIG. 10 with redundant locations of RF scan capture removed.

Referring to FIG. 10, locations of RF scan capture 74 in a venue, such as a shopping mall 72, for example, are shown. Following filtering of redundant RF scan captures, a reduced number of locations of RF scan capture 74 exist, as shown in FIG. 11. By filtering out information that is determined to be redundant, a more uniform distribution of locations of RF scan capture 74 in the venue results. In FIGS. 10 and 11, the locations of RF scan capture 74 are shown in the venue by way of example. As will be understood by a person skilled in the art, the locations of the RF scan captures are unknown to both the electronic device(s) 10 and the server 24 prior to location determination being performed.

The systems, methods and apparatus described herein is usable to determine locations of access points 30 and locations of RF scan captures by one or more electronic devices 10 in the venue. Locations of the electronic devices 10 are unknown because they do not include self-positioning capability or because their self-determined position is unreliable. Unreliable positions may be determined in dense urban areas or indoors, for example.

Although the examples are described with respect to Wi-Fi radio signals, the method, system and apparatus described herein is applicable to other types of radio signals. The systems, methods and apparatus described herein are applicable to any type of radio signal, such as Bluetooth™, BLE (Bluetooth™ Low Energy), FM, AM, Wi-Fi, Digital TV, ZigBee or 6LoWPan, for example.

In an example, the systems, methods and apparatus described herein use crowd-sourced information in order to estimate locations of access points 30 or ranges between access points 30 and generate a fingerprinting reference database. By using crowd sourced information, ranges and locations may be determined at low-cost and on an ongoing basis.

Specific examples have been shown and described herein. However, modifications and variations may occur to those skilled in the art. All such modifications and variations are believed to be within the scope and sphere of the present disclosure.

The invention claimed is:

1. A method of determining locations of access points in a venue, one or more electronic devices configured to receive radio signals from the access points, the method comprising:
   generating and storing, at a server in communication with the one or more electronic devices, a database comprising information received from the one or more electronic devices, the information comprising: values associated with a radio signal characteristic of the radio signals at locations of RF scan capture by the one or more electronic devices and access point identifiers representing access points corresponding to the values, the locations of RF scan capture being unknown at a time of RF scan capture;
   assigning correlation values to quantify similarity between the values for pairs of the access point identifiers;
   mapping the correlation values to correlation ranges based on known locations of at least two of the access points;
   determining the locations of the access points based on the correlation ranges and the known locations.

2. The method of claim 1, wherein the radio signal characteristic is one of: received signal strength, time-based range, and Bit Error Rate.

3. The method of claim 2, wherein the information comprises values associated with other radio signal characteristics.

4. The method of claim 3, comprising combining values of the other radio signal characteristic with the values of the radio signal characteristic, the combined values comprising two or more of: received signal strength values, Bit Error Rate values and time-based range values.

5. The method of claim 1, wherein the information is not geo-tagged.

6. The method of claim 1, wherein the information comprises locations of the one or more electronic devices and the locations are unreliable.

7. The method of claim 1, comprising, prior to assigning correlation values, grouping the information in the database based on common access point identifiers to exclude ones of the pairs of the access point identifiers without overlap at the locations of RF scan capture.

8. The method of claim 1, wherein the venue is an indoor venue.

9. The method of claim 1, comprising, prior to assigning correlation values, determining redundancy between the locations of RF scan capture and excluding values associated with redundant RF scan capture locations.

10. The method of claim 1, wherein the database comprises information received from a single electronic device at different locations of RF scan capture.

11. The method of claim 1, wherein the access point identifiers are MAC addresses.

12. The method of claim 1, wherein the correlation values are between −1 and 1.

13. The method of claim 1, wherein one of the known locations is determined by matching a name of a corresponding access point to a location on a map.

14. A non-transitory computer-readable medium having computer-readable code stored thereon, the computer-readable code executable by at least one processor of the server to perform the method of claim 1.

15. A system for determining locations of access points in a venue, the system comprising:
   one or more electronic devices configured to receive radio signals from the access points; and
   a server in communication with the one or more electronic devices, the server configured to: generate and store a database comprising information received from the one or more electronic devices, the information comprising: values associated with a radio signal characteristic of the radio signals at locations of RF scan capture by the one or more electronic devices and access point identifiers representing access points corresponding to the values, the locations of RF scan capture being unknown at a time of RF scan capture; assign correlation values to quantify similarity between the values for pairs of the access point identifiers; and map the correlation values to correlation ranges based on known locations of at least two of the access points;
   wherein the locations of the access points are determined based on the correlation ranges and the known locations.

16. The system of claim 15, wherein the radio signal characteristic is one of: received signal strength, time-based range, and Bit Error Rate.

17. The system of claim 16, wherein the information comprises values associated with other radio signal characteristics.

18. The system of claim 15, wherein redundancy between the locations of RF scan capture is determined and values associated with redundant RF scan capture locations are excluded.

19. The system of claim 15, wherein the database comprises information received from a single electronic device at different locations of RF scan capture.

20. The system of claim 15, wherein one of the known locations is determined by matching a name of a corresponding access point to a location on a map.

* * * * *